United States Patent
Li et al.

(10) Patent No.: US 10,009,303 B2
(45) Date of Patent: Jun. 26, 2018

(54) MESSAGE PUSH METHOD AND APPARATUS

(71) Applicant: Huawei Technologies Co., Ltd., Shenzhen (CN)

(72) Inventors: Ping Li, Shenzhen (CN); Jianhua Guo, Shenzhen (CN); Jingyu Lai, Bangalore (IN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/110,483

(22) PCT Filed: Jan. 10, 2014

(86) PCT No.: PCT/CN2014/070468
§ 371 (c)(1),
(2) Date: Jul. 8, 2016

(87) PCT Pub. No.: WO2015/103773
PCT Pub. Date: Jul. 16, 2015

(65) Prior Publication Data
US 2016/0337290 A1    Nov. 17, 2016

(51) Int. Cl.
*H04M 1/725* (2006.01)
*H04L 12/58* (2006.01)
(Continued)

(52) U.S. Cl.
CPC .......... *H04L 51/14* (2013.01); *H04L 12/1859* (2013.01); *H04L 67/26* (2013.01);
(Continued)

(58) Field of Classification Search
CPC ..... H04L 51/14; H04L 12/1859; H04L 67/26; H04L 67/306; H04L 67/38; H04L 67/42; H04W 4/008; H04W 12/02
(Continued)

(56) References Cited

U.S. PATENT DOCUMENTS 6,894,994 B1 *  5/2005  Grob ................... H04B 1/7103
                                                    370/335
6,904,449 B1 *  6/2005  Quinones ............. G06Q 10/10
                                                    709/203
(Continued)

FOREIGN PATENT DOCUMENTS

CN         101141694 A      3/2008
CN         101217560 A      7/2008
(Continued)

OTHER PUBLICATIONS

Partial English Translation and Abstract of Chinese Patent Application No. CN103139724, Jun. 5, 2013, 3 pages.
(Continued)

*Primary Examiner* — Marceau Milord
(74) *Attorney, Agent, or Firm* — Conley Rose, P.C.

(57) ABSTRACT

A message push method and apparatus comprise: receiving a push request sent by a service provider server, where the push request carries pushed message content, a service provider server identifier, and a user identity user identity stored by the service provider server; querying a preconfigured information triplet according to the service provider server identifier and the user identity, and acquiring a client identifier of a client that will receive the pushed message content, where a correspondence among the service provider server identifier, the user identity, and the client identifier is recorded in the information triplet; and pushing the pushed message content to the client according to the client identifier. A message push can be implemented in a case in which a service provider server does not need to acquire a client identifier of a target terminal, thereby preventing private data from being exposed.

18 Claims, 11 Drawing Sheets

(51) Int. Cl.
*H04L 12/18* (2006.01)
*H04L 29/08* (2006.01)
*H04W 12/02* (2009.01)
*H04L 29/06* (2006.01)
*H04W 4/80* (2018.01)

(52) U.S. Cl.
CPC .......... *H04L 67/306* (2013.01); *H04L 67/38* (2013.01); *H04L 67/42* (2013.01); *H04W 4/80* (2018.02); *H04W 12/02* (2013.01); *H04M 1/72544* (2013.01); *H04M 1/72561* (2013.01); *H04M 2250/60* (2013.01)

(58) Field of Classification Search
USPC ..................................................... 455/412.1
See application file for complete search history.

(56) References Cited

U.S. PATENT DOCUMENTS

| | | | | |
|---|---|---|---|---|
| 7,069,234 | B1* | 6/2006 | Cornelius | G06Q 20/10 705/26.35 |
| 7,124,101 | B1* | 10/2006 | Mikurak | G06Q 10/06 705/35 |
| 7,167,844 | B1* | 1/2007 | Leong | G06Q 30/04 705/37 |
| 8,032,409 | B1* | 10/2011 | Mikurak | G06Q 10/00 705/14.39 |
| 8,375,400 | B2* | 2/2013 | Sutedja | G06Q 10/107 719/313 |
| 8,447,843 | B2* | 5/2013 | Johnson | G06Q 10/103 709/220 |
| 8,793,389 | B2* | 7/2014 | Lindner | H04L 65/403 379/202.01 |
| 8,880,659 | B2* | 11/2014 | Mower | H04L 41/0803 709/220 |
| 9,420,436 | B2* | 8/2016 | Xu | H04W 4/08 |
| 9,467,415 | B2* | 10/2016 | Xu | H04W 4/08 |
| 9,503,354 | B2* | 11/2016 | Mower | H04L 12/2697 |
| 9,538,248 | B2* | 1/2017 | Kim | H04N 21/478 |
| 2004/0064351 | A1* | 4/2004 | Mikurak | G06Q 10/087 705/22 |
| 2006/0030344 | A1 | 2/2006 | Lim | |
| 2006/0178918 | A1* | 8/2006 | Mikurak | G06Q 10/06 705/7.25 |
| 2007/0043868 | A1* | 2/2007 | Kumar | G06F 17/30707 709/226 |
| 2008/0025307 | A1* | 1/2008 | Preiss | H04L 67/26 370/392 |
| 2008/0119172 | A1* | 5/2008 | Rao | H04L 12/189 455/414.1 |
| 2008/0162637 | A1* | 7/2008 | Adamczyk | H04L 12/5815 709/204 |
| 2009/0044252 | A1 | 2/2009 | Kashima et al. | |
| 2011/0231478 | A1* | 9/2011 | Wheeler | G06F 17/30864 709/203 |
| 2011/0258332 | A1 | 10/2011 | Fan et al. | |
| 2012/0066330 | A1* | 3/2012 | Fan | H04L 12/1859 709/206 |
| 2012/0171992 | A1* | 7/2012 | Cheong | H04L 63/067 455/410 |
| 2013/0132854 | A1* | 5/2013 | Raleigh | G06F 3/0482 715/738 |
| 2013/0337860 | A1* | 12/2013 | Xu | H04W 4/08 455/518 |
| 2014/0011527 | A1* | 1/2014 | Xu | H04W 4/08 455/466 |
| 2016/0087933 | A1* | 3/2016 | Johnson | H04W 4/001 709/245 |

FOREIGN PATENT DOCUMENTS

| | | |
|---|---|---|
| CN | 101764828 A | 6/2010 |
| CN | 102638416 A | 8/2012 |
| CN | 102868981 A | 1/2013 |
| CN | 103139724 A | 6/2013 |
| CN | 103297967 A | 9/2013 |
| KR | 20060010692 A | 2/2006 |

OTHER PUBLICATIONS

Foreign Communication From a Counterpart Application, Chinese Application No. 201480000729.7, Chinese Office Action dated Oct. 9, 2016, 8 pages.
Foreign Communication From a Counterpart Application, PCT Application No. PCT/CN2014/070468, English Translation of International Search Report dated Oct. 15, 2014, 2 pages.
Foreign Communication From a Counterpart Application, PCT Application No. PCT/CN2014/070468, English Translation of Written Opinion dated Oct. 15, 2014, 14 pages.
Machine Translation and Abstract of Chinese Publication No. CN102638416, Aug. 15, 2012, 13 pages.
Foreign Communication From a Counterpart Application, Chinese Application No. 2014800007297, Chinese Notice of Allowance dated May 23, 2017, 4 pages.

* cited by examiner

MESSAGE PUSH METHOD AND APPARATUS

CROSS-REFERENCE TO RELATED APPLICATIONS

This application is a national stage application of international patent application number PCT/CN2014/070468 filed on Jan. 10, 2014, which is incorporated by reference.

TECHNICAL FIELD

The present disclosure relates to the field of network communications technologies, and in particular, to a message push method and apparatus.

BACKGROUND

A message push technology, also referred to as a PUSH technology, is a client/server communication mechanism-based technology in which a server actively sends a message to a client. The technology is one of the currently popular technologies on the mobile Internet.

Generally, when a service provider (SP) needs to PUSH a message to a specified client, an SP server needs to specify identity information of the client that is to receive the message, where the identity information includes a device identifier (deviceID). Next, a PUSH server forwards, to the client that is specified by the SP server to receive the message, to-be-pushed message content according to the deviceID, so as to PUSH the message to the specified client.

In the foregoing process of message push, information is transparent to a message pusher and a message receiver. Because a deviceID often exists in the form of a hardware device media access control (MAC) code, an International Mobile Equipment Identity (IMEI) or a mobile phone number, in a conventional process of message push, an SP server may obtain, by using the deviceID, some private information of relatively high privacy of a user; however, when using a PUSH service, the user does not expect such private information to be exposed.

SUMMARY

Embodiments of the present disclosure provide a message push method and apparatus, so as to implement message push in a case in which an SP server does not need to acquire a device ID of a target terminal.

According to a first aspect, a message push method is provided, including receiving a push request sent by a service provider server, where the push request carries pushed message content, a service provider server identifier, and a user identity stored by the service provider server; querying a preconfigured information triplet according to the service provider server identifier and the user identity, and acquiring a client identifier of a client that will receive the pushed message content, where a correspondence among the service provider server identifier, the user identity, and the client identifier is recorded in the information triplet; and pushing the pushed message content to the client according to the client identifier.

With reference to the first aspect, in a first implementation manner, the information triplet includes the client identifier, the service provider server identifier, and the user identity, where the client identifier is locally acquired or is acquired from a push server side through network interaction; the service provider server identifier is acquired from the service provider server side; and the user identity is acquired from the service provider server side.

With reference to the first implementation manner of the first aspect, in a second implementation manner, before the receiving a push request sent by a service provider server, the method further includes acquiring status information indicating that a message push service is activated for a user account corresponding to the user identity; and sending, according to the service provider server identifier recorded in the information triplet and to the service provider server corresponding to the service provider server identifier, the status information indicating that the message push service is activated for the user account.

According to a second aspect, a message push method is provided, including acquiring interaction information that includes a service provider service provider server identifier and a user identity that is stored by a service provider server; parsing the interaction information to obtain the service provider server identifier and the user identity; acquiring a client identifier; forming an information triplet by using the service provider server identifier, the user identity, and the client identifier; and sending the information triplet to a push server, so that the push server pushes a message according to the information triplet.

With reference to the second aspect, in an implementation manner, the acquiring interaction information that includes a service provider server identifier and a user identity specifically includes acquiring, by scanning a graphic code provided by the service provider server side, the interaction information that includes the service provider server identifier and the user identity; or acquiring, by accessing a uniform resource locator link address provided by the service provider server, the interaction information that includes the service provider server identifier and the user identity; or acquiring, by accessing, in a manner of near-field communication (NFC), an NFC tag provided by the service provider server, the interaction information that includes the service provider server identifier and the user identity.

With reference to the second aspect or the first implementation manner of the second aspect, in a second implementation manner, the acquiring a client identifier specifically includes acquiring the client identifier from a local client side, or acquiring the client identifier from the push server side by performing network interaction with the push server.

According to a third aspect, a message push apparatus is provided, including a receiving unit, a query unit, and a push unit, where the receiving unit is configured to receive a push request sent by a service provider server, where the push request carries pushed message content, a service provider server identifier, and a user identity stored by the service provider server; and send the service provider server identifier and the user identity to the query unit; the query unit is configured to query a preconfigured information triplet according to the service provider server identifier and the user identity, and acquire a client identifier of a client that will receive the pushed message content, where a correspondence among the service provider server identifier, the user identity, and the client identifier is recorded in the information triplet; and the push unit is configured to push, according to the client identifier that is of the client that will receive the pushed message content and determined by the query unit, the pushed message content received by the receiving unit to the client.

With reference to the third aspect, in a first implementation manner, the information triplet included in the query unit includes the client identifier, the service provider server identifier, and the user identity, where the client identifier is locally acquired or is acquired from a push server side through network interaction; the service provider server identifier is acquired from the service provider server side; and the user identity is acquired from the service provider server side.

With reference to the first implementation manner of the third aspect, in a second implementation manner, the apparatus further includes a sending unit, where the sending unit is configured to acquire status information indicating that a message push service is activated for a user account corresponding to the user identity; and send, according to the service provider server identifier recorded in the information triplet and to the service provider server corresponding to the service provider server identifier, the status information indicating that the message push service is activated for the user account.

According to a fourth aspect, a message push apparatus is provided, including an acquiring unit, a parsing unit, a forming unit, and a sending unit, where the acquiring unit is configured to acquire interaction information that includes a service provider server identifier and a user identity that is stored by a service provider server, and send the interaction information to the parsing unit; and is further configured to acquire a client identifier and send the client identifier to the forming unit; the parsing unit is configured to parse the interaction information to obtain the service provider server identifier and the user identity, and send, to the forming unit, the service provider server identifier and the user identity that are obtained through parsing; the forming unit is configured to form an information triplet by using the service provider server identifier, the user identity, and the client identifier; and the sending unit is configured to send the information triplet formed by the forming unit to a push server, so that the push server pushes a message according to the information triplet.

With reference to the fourth aspect, in a first implementation manner, the acquiring unit is specifically configured to acquire, by scanning a graphic code provided by the service provider server side, the interaction information that includes the service provider server identifier and the user identity; or acquire, by accessing a uniform resource locator link address provided by the service provider server, the interaction information that includes the service provider server identifier and the user identity; or acquire, by accessing, in a manner of NFC, an NFC tag provided by the service provider server, the interaction information that includes the service provider server identifier and the user identity.

With reference to the fourth aspect or the first implementation manner of the fourth aspect, in a second implementation manner, the acquiring unit is specifically configured to acquire the client identifier from a local client side; or acquire the client identifier from the push server side by performing network interaction with the push server.

According to a fifth aspect, a message push apparatus is provided, including a transceiver, a processor, a memory, and a bus, where the transceiver, the processor, and the memory are all connected to the bus; the memory is connected to the processor, and stores program code executed by the processor; and the processor is connected to the memory and the transceiver, and is configured to receive, by using the transceiver and according to a program stored by the memory, a push request that is sent by a service provider server and that carries pushed message content, a service provider server identifier, and a user identity stored by the service provider server; query a preconfigured information triplet according to the service provider server identifier and the user identity; acquire a client identifier of a client that will receive the pushed message content; and push the pushed message content to the client according to the client identifier, where a correspondence among the service provider server identifier, the user identity, and the client identifier is recorded in the information triplet.

With reference to the fifth aspect, in a first implementation manner, the information triplet included by the processor includes the client identifier, the service provider server identifier, and the user identity; and the transceiver is configured to acquire the client identifier locally or acquire the client identifier from a push server side through network interaction; acquire the service provider server identifier from the service provider server side; and acquire the user identity from the service provider server side.

With reference to the first implementation manner of the fifth aspect, in a second implementation manner, the transceiver is further configured to acquire status information indicating that a message push service is activated for a user account corresponding to the user identity; and the processor is further configured to: send, according to the service provider server identifier recorded in the information triplet and to the service provider server corresponding to the service provider server identifier, the status information indicating that the message push service is activated for the user account.

According to a sixth aspect, a message push apparatus is provided, comprising a transceiver, a processor, a memory, and a bus, where the transceiver, the processor, and the memory are all connected to the bus; the memory is connected to the processor, and stores program code executed by the processor; and the processor is connected to the memory and the transceiver, and is configured to acquire, by using the transceiver and according to a program stored by the memory, a client identifier and interaction information that includes a service provider server identifier and a user identity that is stored by a service provider server; parse the interaction information to obtain the service provider server identifier and the user identity; form an information triplet by using the service provider server identifier, the user identity, and the client identifier; and send the information triplet to a push server, so that the push server pushes a message according to the information triplet to form the information triplet.

With reference to the sixth aspect, in a first implementation manner, the transceiver is configured to acquire, by scanning a graphic code provided by the service provider server side, the interaction information that includes the service provider server identifier and the user identity; or acquire, by accessing a uniform resource locator link address provided by the service provider server, the interaction information that includes the service provider server identifier and the user identity; or acquire, by accessing, in a manner of NFC, an NFC tag provided by the service provider server, the interaction information that includes the service provider server identifier and the user identity.

With reference to the sixth aspect or the first implementation manner of the sixth aspect, in a second implementation manner, the transceiver is configured to acquire the client identifier from a local client side; or acquire the client identifier from the push server side by performing network interaction with the push server.

According to the message push method and apparatus provided in the embodiments of the present disclosure, a push request sent by a service provider server carries a service provider server identifier and a user identity and does not carry a client identifier. After receiving the service provider server identifier and the user identity that are carried in the push request, a push server queries information about a preconfigured information triplet, determines a client identifier of a client that will receive pushed message content, and pushes the pushed message content to the client according to the determined client identifier. Therefore, according to the present disclosure, message push can be implemented in a case in which a service provider server does not need to acquire a client identifier, thereby preventing private data from being exposed.

DESCRIPTION OF EMBODIMENTS

The following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
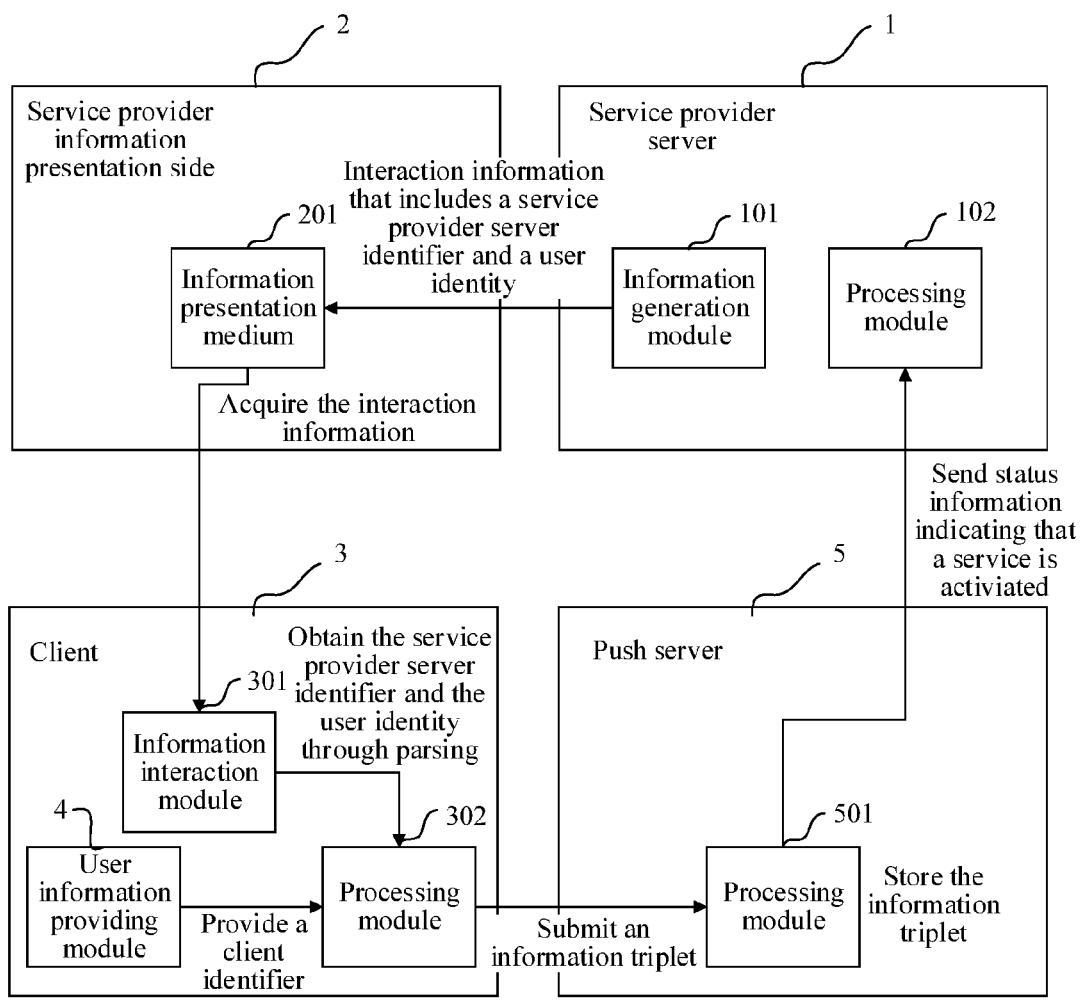
FIG. 1 is a schematic diagram of a logical structure of a system for implementing message push, involved in an embodiment of the present disclosure.

A message push method provided in an embodiment of the present disclosure is applied to a schematic diagram of a logical structure of a system for implementing message push shown in FIG. 1. An SP server 1 in FIG. 1 is a server of a service provider that provides specific content of a PUSH service, and includes an information generation module 101 and a processing module 102 that are related to this embodiment of the present disclosure, where the information generation module 101 can an SP server identity (spID) and a user identity (userID), which may be an account or an email address, of a user registered at the service provider.

In this embodiment of the present disclosure, the information generation module 101 of the SP server 1 processes the spID that identifies identity information of the SP server, and information of the user identity userID of the user registered at the SP service provider, to form interaction information that can be acquired by another device, and releases the interaction information to an SP information presentation side 2 for a client to acquire the interaction information.

In this embodiment of the present disclosure, the information generation module 101 may process the spID and the userID in multiple manners, for example, by using a graphic code (including a two-dimensional code, a barcode, and the like), a uniform resource locator (URL) link address, or an NFC tag.

In this embodiment of the present disclosure, an information presentation medium 201 of the SP information presentation side 2 may be any presentation medium that can present the foregoing involved interactive information. For example, the information presentation medium 201 may be a web page, a client interface or a wall that can present information in the physical world.

In this embodiment of the present disclosure, the interactive information that includes the spID and the userID is published to the information presentation medium 201 of the SP information presentation side 2, and an information interaction module 301 of a client 3 may use different acquiring manners according to presentation forms of the interaction information. For example, when the interaction information is presented in a form of a two-dimensional code, the interaction information may be acquired through photographing or scanning; when the interaction information is presented in a form of an NFC tag, the interaction information may be acquired in a manner of NFC.

The information interaction module 301 of the client 3 obtains the spID and the userID by parsing the acquired interactive information, and submits the spID and the userID to a processing module 302 of the client 3 for processing. The processing module 302 forms an information triplet by using the acquired spID and userID and a client identifier deviceID acquired from a user information providing module 4. In this embodiment of the present disclosure, the information triplet is recorded as map <deviceID, spID, userID>. The information triplet may be formed in multiple manners, for example, in a manner of a compressed package.

Further, in this embodiment of the present disclosure, the user information providing module 4 may be located on the client 3 side, where the processing module 302 of the client 3 actively extracts the deviceID; or may be an independent module, and actively generates client identifier information through user input and submits the client identifier information to the processing module 302 of the client 3. In this embodiment of the present disclosure, the user information providing module 4 may also be located on a PUSH server side, where the processing module 302 of the client 3 acquires the deviceID from the PUSH server side in a manner of network interaction.

In this embodiment of the present disclosure, the processing module 302 of the client 3 sends the formed information triplet map <deviceID, spID, userID> to a PUSH server 5, and the PUSH server 5 stores the received information triplet map <deviceID, spID, userID>, so that a processing module 501 of the PUSH server 5 can push and forward a message according to the information triplet map <deviceID, spID, userID> when a PUSH request of the SP server is received. The PUSH server shields the deviceID from the SP server by using the information triplet, and can perform addressing for the client according to the deviceID recorded in the information triplet, and push pushed message content to the client.

Figure 2:
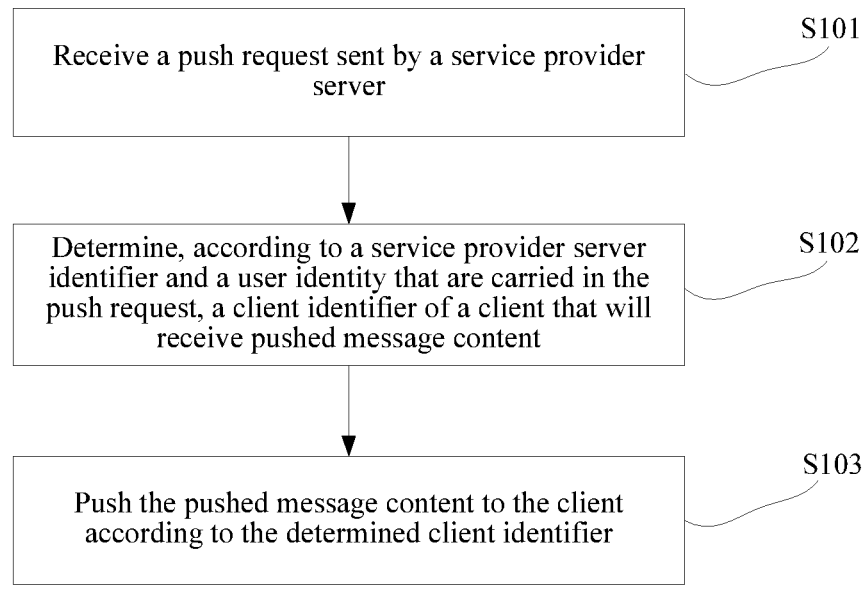
FIG. 2 is a schematic flowchart of executing message push by a PUSH server according to an embodiment of the present disclosure.

In an embodiment of the present disclosure, a process of executing message push by a PUSH server is used as an example for description. As shown in FIG. 2, the process includes:

S101: Receive a PUSH request sent by an SP server.

In this embodiment of the present disclosure, the PUSH request sent by the SP server carries pushed message content, an SP server identity spID, and a user account identifier userID stored by the SP server.

S102: Acquire, according to the spID and the userID that are carried in the PUSH request, a deviceID of a client that will receive pushed message content.

S103: Push the pushed message content to the client according to the deviceID determined in S102.

In this embodiment of the present disclosure, a PUSH request sent by an SP server carries an spID and a userID and does not carry a deviceID of a target terminal. Instead, after receiving the spID and the userID that are carried in the PUSH request, a PUSH server determines a deviceID of a client that will receive pushed message content, and pushes the pushed message content to the client according to the determined deviceID. Therefore, in this embodiment of the present disclosure, message push can be implemented in a case in which an SP server does not need to acquire a deviceID of a target terminal, thereby preventing private data from being exposed.

Figure 3A:
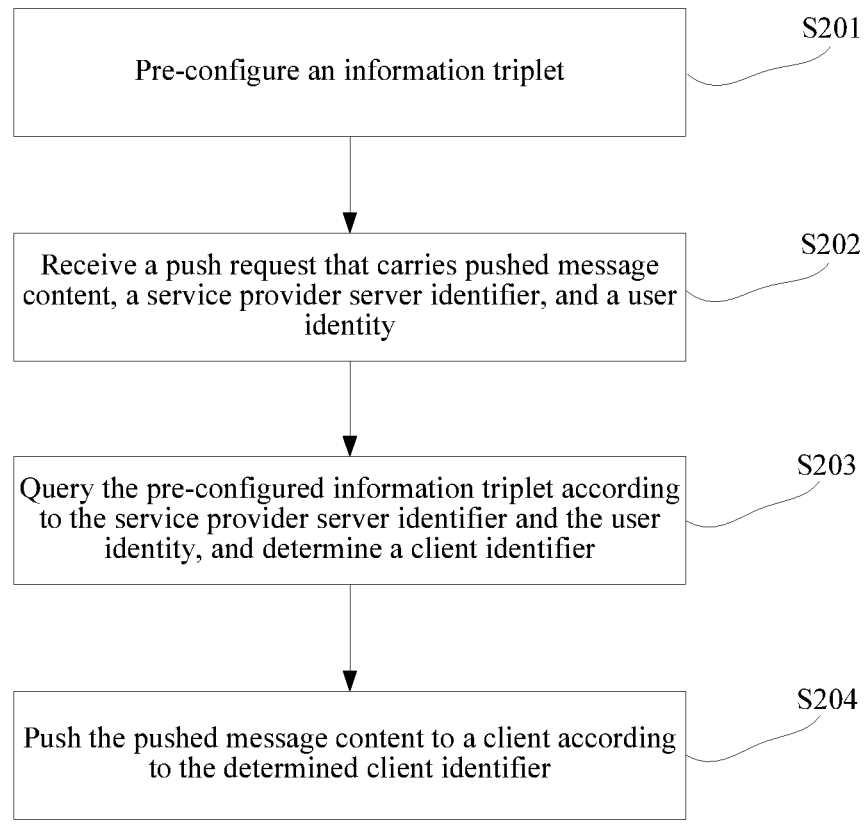
FIG. 3A and FIG. 3B are still other schematic flowcharts of executing message push by a PUSH server according to an embodiment of the present disclosure.

Further, in this embodiment of the present disclosure, an information triplet in which a correspondence among an spID, a userID, and a deviceID is recorded may be preconfigured, where the information triplet includes a deviceID of a client, the spID, and the userID, where the deviceID of the client is locally acquired or is acquired from a PUSH server side through network interaction; the spID is acquired from an SP server side; and the userID is acquired from the SP server side. The PUSH server may query the preconfigured information triplet according to the spID and the userID that are carried in the received PUSH request, determine the deviceID of the client that will receive the pushed message content, and push the pushed message content to the client according to the deviceID. A process of message push and forwarding performed by the PUSH server side is shown in FIG. 3A, and includes:

S201: Pre-configure an information triplet in which a correspondence among an spID, a userID, and a deviceID is recorded.

In this embodiment of the present disclosure, the information triplet in which the correspondence among the spID, the userID, and the deviceID is recorded may be obtained by a client by packaging the locally acquired deviceID or the deviceID acquired from the PUSH server side and the spID and the userID that are acquired from an SP server side, and is then sent to the PUSH server, so that the PUSH server stores the information triplet for subsequent use. When the PUSH server stores the information triplet, the information triplet may be stored in a form of an original text file, or may be stored in an encrypted manner by using a database, or may be stored as an encoded encrypted file.

S202: Receive a PUSH request that carries pushed message content, the spID, and the userID.

S203: Query, according to the spID and the userID, the information triplet preconfigured in S201, and determine deviceID of a client that will receive the pushed message content.

Specifically, in this embodiment of the present disclosure, the PUSH server prestores the information triplet in which the correspondence among the spID, the userID, and the deviceID is recorded; therefore, the deviceID that is corresponding to the spID and the userID may be matched by querying the prestored information triplet according to the received spID and userID.

S204: Push the pushed message content to the client according to the determined deviceID.

Further, in this embodiment of the present disclosure, the SP server preconfigures the information triplet; therefore, according to the userID and the spID recorded in the information triplet, when a message push service is activated for the userID, status information indicating that the message push service is activated for the userID may be sent to the SP server corresponding to the spID, so that the SP server pushes a message to only a user for which the message push service has been activated. Specifically, in this embodiment of the present disclosure, when the message push service is activated for a user account corresponding to the userID recorded in the information triplet, before S202 of receiving a PUSH request sent by the SP server is executed, the method further includes:

S200: Acquire status information indicating that a message push service is activated for a user account corresponding to the userID, and send, according to the spID recorded in the information triplet, to an SP server corresponding to the spID, the status information indicating that the message push service is activated for the user account corresponding to the userID.

Figure 3B:
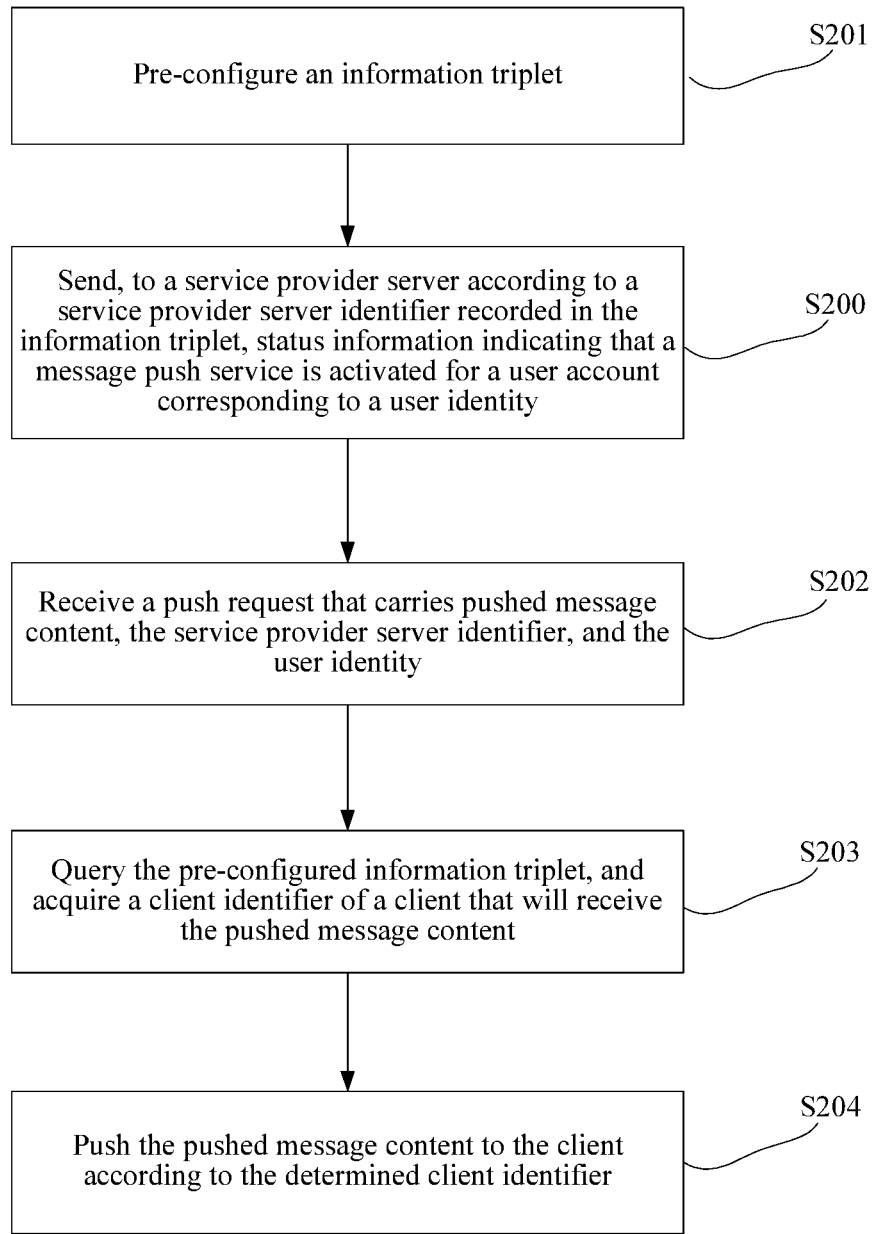

A specific execution process is similar to the process involved in the foregoing embodiment, and is not described herein again, and reference may be made to FIG. 3B.

Figure 3C:
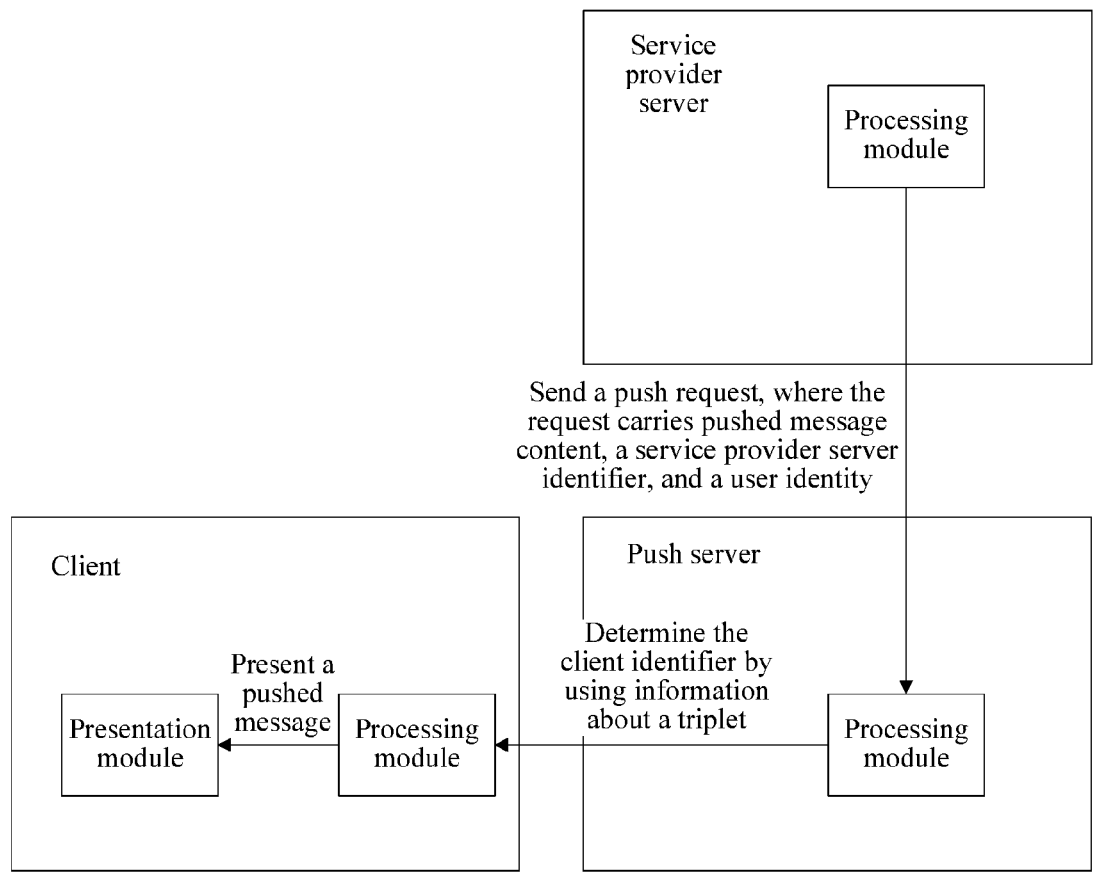
FIG. 3C is a schematic diagram of a process of implementing message push according to an embodiment of the present disclosure.

Further, the client in this embodiment of the present disclosure may include a presentation module configured to present the pushed message content forwarded by the PUSH server. FIG. 3C is a schematic diagram of a message push process according to this embodiment of the present disclosure.

In FIG. 3C, a processing module of an SP server 1 pushes a PUSH request to a PUSH server, to specify that an SP server with an identifier being spID requests to push message content info to a userID, that is, the PUSH request carries <info, spID, userID>. A processing module of a PUSH server 4 finds, by using a preconfigured information triplet map <deviceID, spID, userID> and the received <info, spID, userID>, a deviceID that is corresponding to the spID and the userID that are carried in the PUSH request, and pushes the message content info to the deviceID corresponding to the userID. A processing module of a client 3 sends the message content info to the presentation module 303, and the presentation module presents and displays the message content info.

Figure 4:
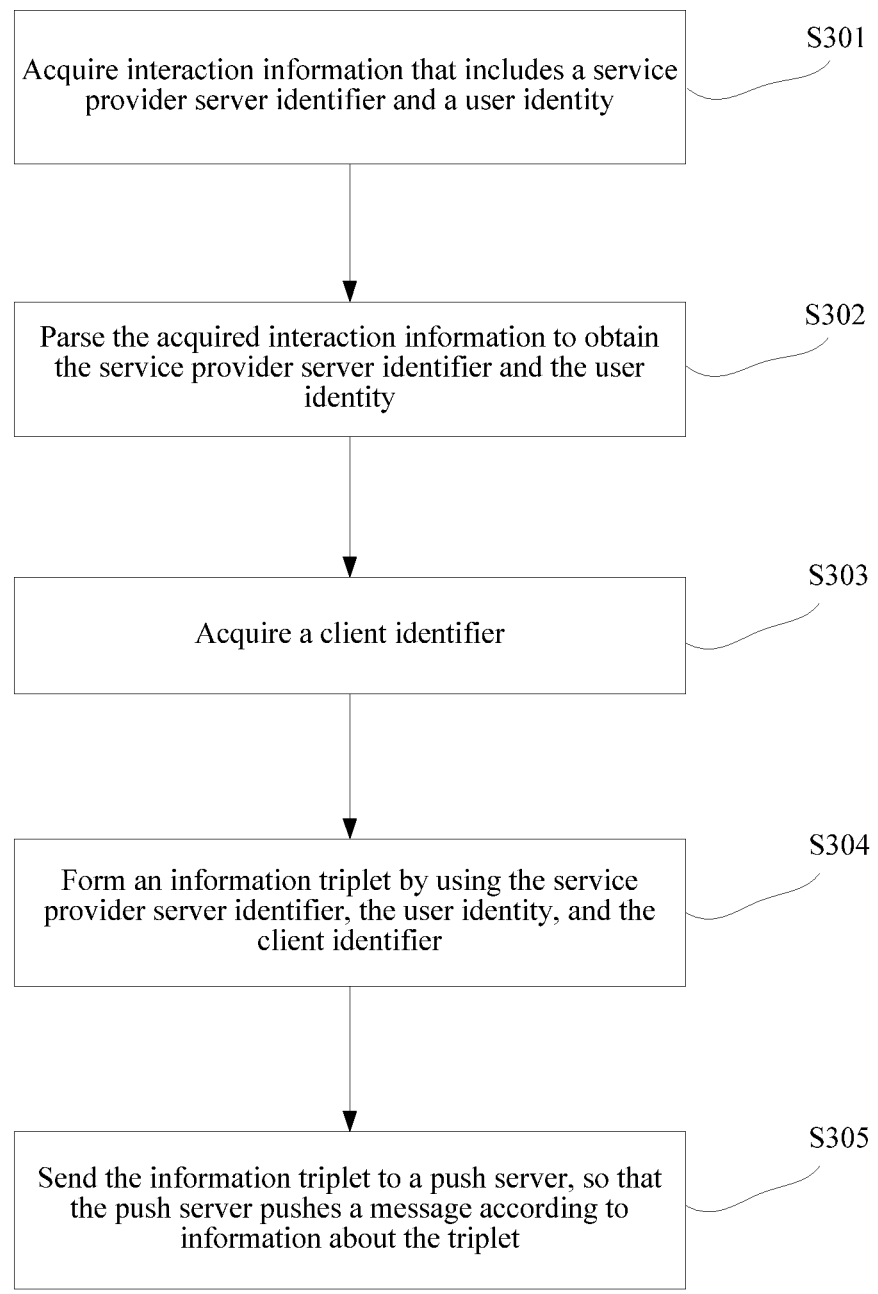
FIG. 4 is a schematic flowchart of forming, by a client, an information triplet and sending the information triplet to a PUSH server for message push and forwarding according to an embodiment of the present disclosure.

In another embodiment of the present disclosure, a process in which an information triplet is formed on a client 3 side and is sent to a PUSH server for message push and forwarding is described. As shown in FIG. 4, the process includes:

S301: Acquire interaction information that includes an spID of an SP server and a userID stored by the SP server.

Specifically, in this embodiment of the present disclosure, the client may acquire the spID and the userID in multiple manners. For example, the interaction information that includes the spID and the userID may be generated through user input and is submitted to a processing module of the client; or an information generation module of the SP server may package the spID and the userID, and send the spID and the userID to an information presentation medium of the SP, and an information interaction module of the client acquires, according to specific manners of packaging processing of the SP server, the interaction information in different acquiring manners.

In this embodiment of the present disclosure, the client may acquire the interaction information that includes the spID and the userID in the following exemplary manners.

When the SP server publishes the interaction information by using a graphic code (including a two-dimensional code, a barcode, and the like), the client acquires, by scanning the graphic code provided by the SP server side, the interaction information that includes the spID and the userID.

When the SP server publishes the interaction information by using a URL link address, the client acquires, by accessing the URL link address provided by the SP server, the interaction information that includes the spID and the userID.

When the SP server publishes the interaction information by using an NFC tag, the client may access, in a manner of NFC, the NFC tag provided by the SP server, to acquire the interaction information that includes the spID and the userID.

S302: Parse the interaction information acquired in S301 to obtain the spID and the userID.

S303: Acquire a deviceID of a client.

Specifically, in this embodiment of the present disclosure, the client may also acquire the deviceID of the client in multiple manners. For example, identifier information of some local terminals may be acquired from the client, and the processing module of the client automatically extracts the deviceID of the client from the system; or the deviceID of the client is submitted to the processing module of the client through user input. In this embodiment of the present disclosure, in a case in which the deviceID of the client may need to be generated by the PUSH server, the client may acquire the deviceID of the client from the PUSH server in a manner of network interaction.

S304: Form an information triplet by using the spID, the userID, and the deviceID.

Specifically, in this embodiment of the present disclosure, packaging processing may be performed on the spID, the userID, and the deviceID to form the information triplet by connecting the spID, the userID, and the deviceID.

S305: Send the formed information triplet to the PUSH server, so that the PUSH server pushes a message according to the information triplet.

In this embodiment of the present disclosure, for a process in which the PUSH server pushes the message according to the information triplet, reference may be made to the foregoing embodiments, and details are not described herein again.

In the foregoing embodiment of the present disclosure, the information triplet is formed on the client, so that network interaction of information can be reduced and resource occupancy is reduced.

In the present disclosure, the foregoing involved message push method is described in detail below with reference to an actual application.

This embodiment of the present disclosure is described by using a process in which an SP service vendor of a web game pushes a message to a game user by using an information triplet, without exposing private information of a terminal used by the game user.

In this embodiment of the present disclosure, the game user may use multiple types of terminals (clients). This embodiment of the present disclosure is described by using an example in which the game user uses a mobile terminal and acquires interaction information in a manner of scanning a graphic code.

In this embodiment of the present disclosure, a process of message push includes two stages, which are an initialization stage and a push stage.

Initialization Stage

Figure 5A:
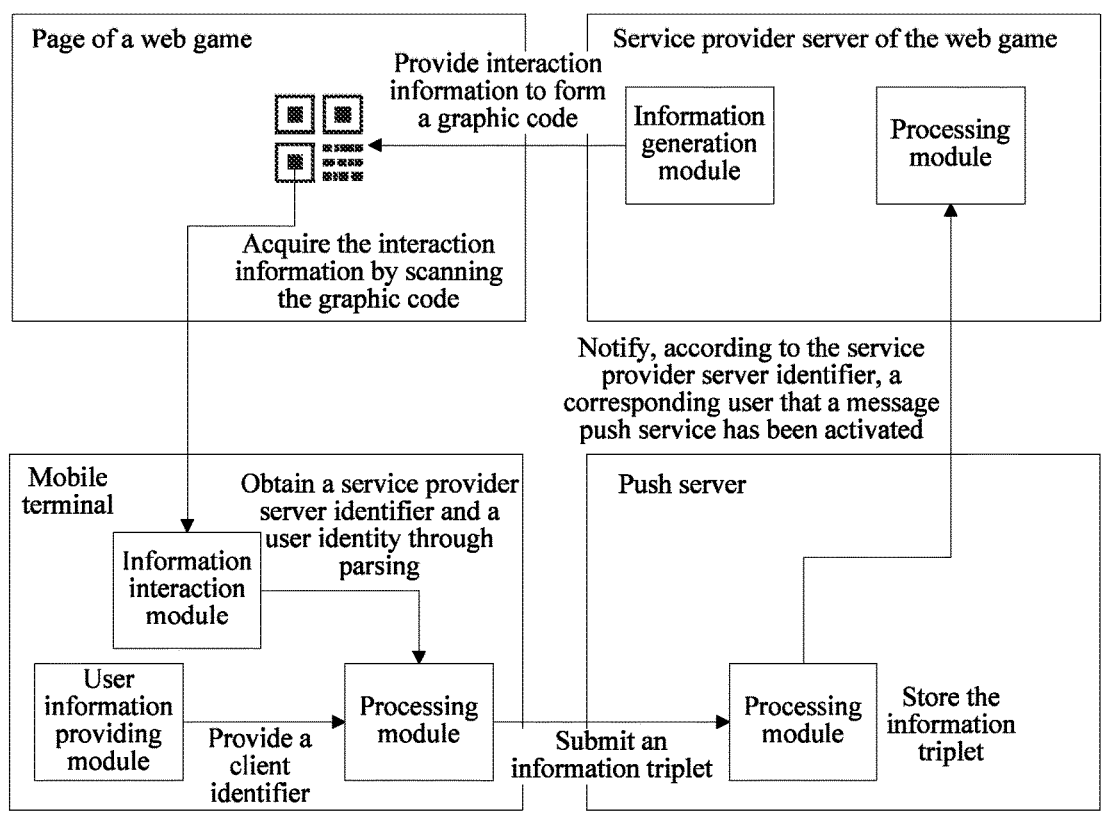
FIG. 5A and FIG. 5B are schematic diagrams of a logical structure of a system involved in an initialization stage according to an embodiment of the present disclosure.

In this embodiment of the present disclosure, a logical structure of a system involved in the initialization stage is shown in FIG. 5A. An SP server of a web game is used as a provider of pushed message content, and has an information generation module and a processing module that are related to this embodiment of the present disclosure, in addition to service logic of the SP server of the web game. The information generation module of the SP server of the web game can package identifier information spID of the SP server of the web game and game account information userID of the player user registered at the SP server of the web game, to form a graphic code, and publish the graphic code to a web page of the web game, so that the game user acquires interaction information through scanning by using a mobile terminal used by the game user.

The game user interacts with the web page of the web game in a manner of scanning the graphic code by using an information interaction module (which, for example, may be a camera of the mobile terminal) of the mobile terminal used by the game user, acquires the graphic code that includes the identifier information spID of the SP server of the web game and the game account information userID of the player user registered at the SP server of the web game, and parses the graphic code to acquire the spID of the SP server of the web game and the game account userID of the player user. The information interaction module of the mobile terminal sends the acquired spID of the SP server of the web game and the acquired game account userID of the player user to a processing module of the mobile terminal.

A user information providing module provides terminal identifier information deviceID of the mobile terminal, and submits the deviceID to the processing module of the mobile terminal. The processing module of the mobile terminal performs packaging processing on the spID of the SP server of the web game, the game account userID of the game user, and the terminal identifier information deviceID of the mobile terminal, to form an information triplet map <deviceID, spID, userID>, and submits the information triplet map <deviceID, spID, userID> to a processing module of a PUSH server.

Figure 5B:
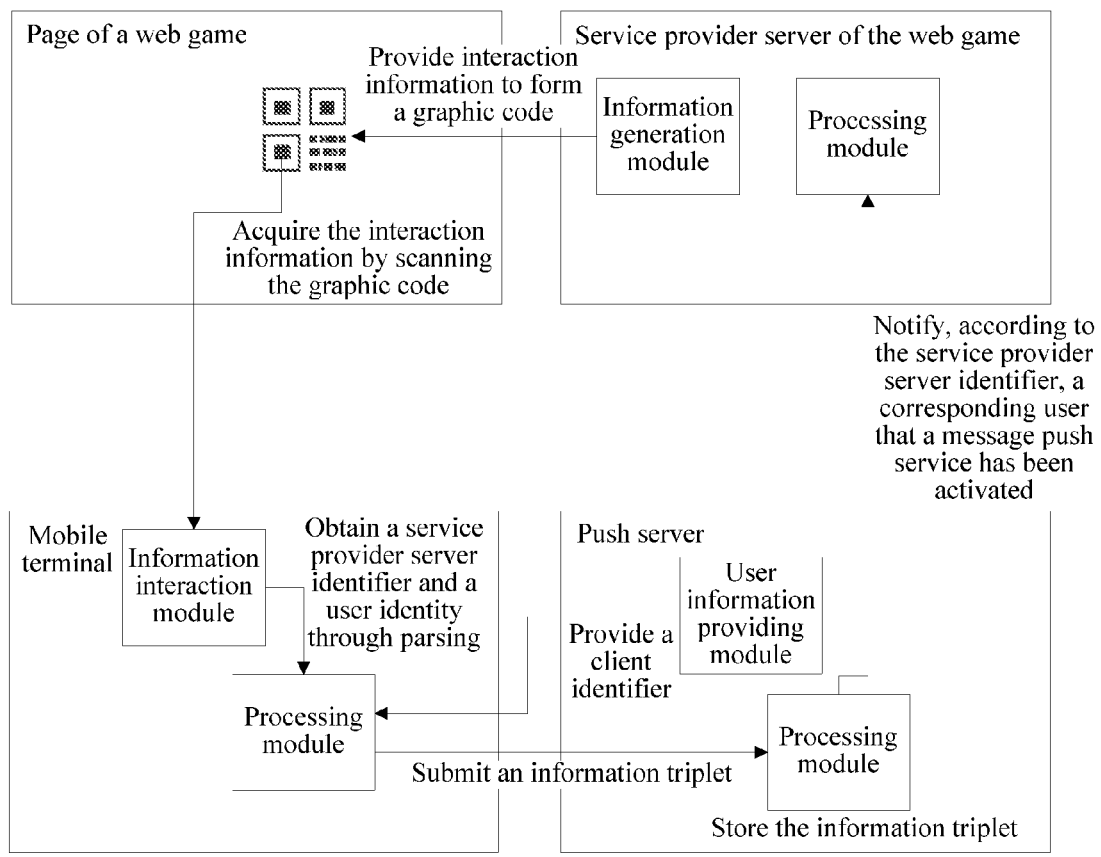

Specifically, in this embodiment of the present disclosure, the user information providing module may be located on the mobile terminal side, as shown in FIG. 5A, or may be located on the PUSH server side, as shown in FIG. 5B.

The processing module of the PUSH server receives the information triplet map <deviceID, spID, userID> sent by the processing module of the mobile terminal, stores the information triplet, determines the SP server of the web game according to the spID in the information triplet, and sends, to the SP server of the web game, status information indicating that a message push service is already activated for the game user with the game account being the userID. Then, the initialization stage ends.

Push Stage

Figure 6:
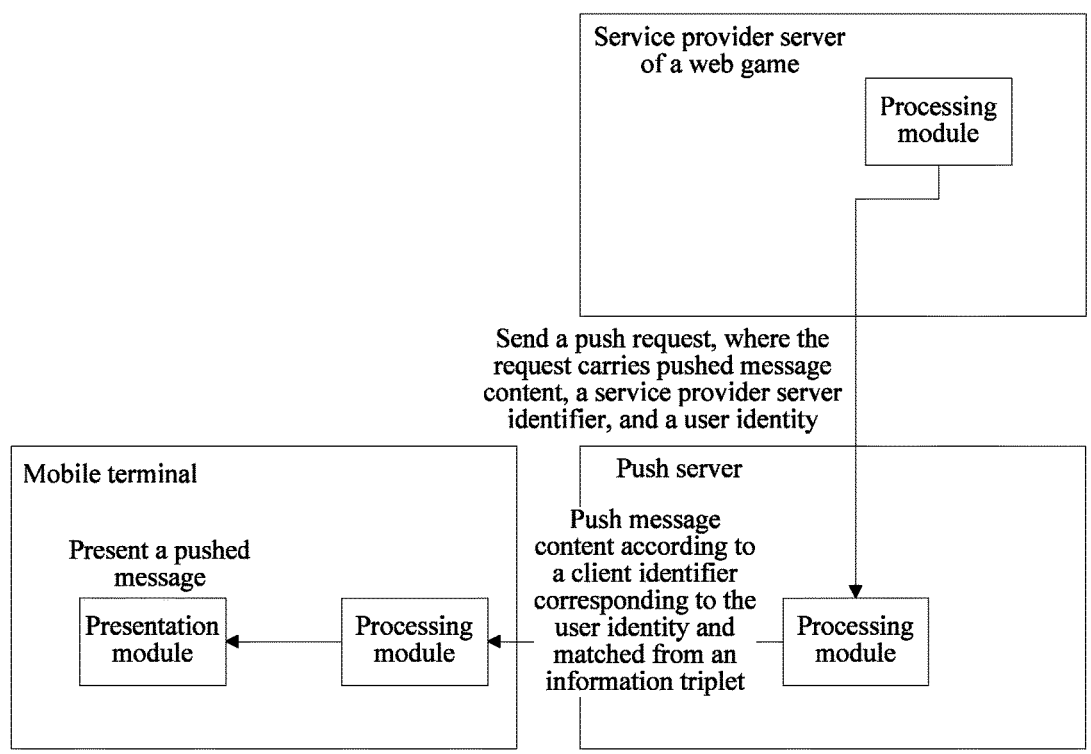
FIG. 6 is a schematic diagram of a logical structure of a system involved in a push stage according to an embodiment of the present disclosure.

In this embodiment of the present disclosure, a schematic diagram of a logical structure of a system involved in the push stage is shown in FIG. 6. The processing module of the SP server of the web game sends a PUSH request to the PUSH server, where the PUSH request carries pushed message content info, the game account userID, and the identifier spID of the SP server of the web game.

After receiving the PUSH request sent by the processing module of the SP server of the web game, the processing module of the PUSH server finds a device identifier deviceID of the mobile terminal used by the player user according to the prestored information triplet map <deviceID, spID, userID>, and pushes, to the game user according to the found deviceID, the message content info pushed by the SP server of the web game.

Further, in this embodiment of the present disclosure, a presentation module of the mobile terminal presents, to the user, the message content info that is pushed by the SP server of the web game and is received by the processing module of the mobile terminal. In this embodiment of the present disclosure, the presentation module of the mobile terminal may be an APP application icon, and the game user may trigger the APP application icon through tapping, to present and display related information.

In the message push process involved in the foregoing embodiment of the present disclosure, a PUSH server queries and determines a deviceID by using an information triplet, so that the deviceID is shielded from an SP server of a web game, thereby preventing private information of a terminal used by a game user from being exposed.

Figure 7A:
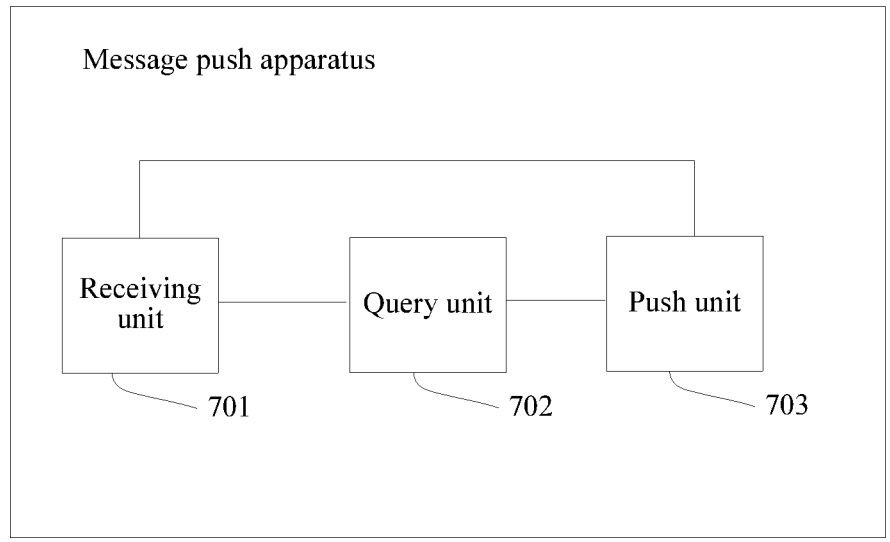
FIG. 7A to FIG. 7C are schematic structural diagrams of a message push apparatus according to an embodiment of the present disclosure.

Based on the message push method that is executed based on the PUSH server in the foregoing embodiment, an embodiment of the present disclosure further provides a message push apparatus. As shown in FIG. 7A, the message push apparatus includes a receiving unit 701, a query unit 702, and a push unit 703.

The receiving unit 701 is configured to receive a push request sent by a service provider server, where the push request carries pushed message content, a service provider server identifier a service provider server identifier, and a user identity stored by the service provider server, and send the service provider server identifier and the user identity to the query unit 702.

The query unit 702 is configured to query a preconfigured information triplet according to the received service provider server identifier and user identity, and acquire a client identifier of a client that will receive the pushed message content, where a correspondence among the service provider server identifier, the user identity, and the client identifier is recorded in the information triplet.

The push unit 703 is configured to push, to the client according to the client identifier that is of the client that will receive the pushed message content and determined by the query unit 702, the pushed message content received by the receiving unit 701.

In a first implementation manner, the information triplet included in the query unit 702 in this embodiment of the present disclosure includes the client identifier, the service provider server identifier, and the user identity, where the client identifier is locally acquired or is acquired from a push server side through network interaction; the service provider server identifier is acquired from the service provider server side; and the user identity is acquired from the service provider server side.

Figure 7B:
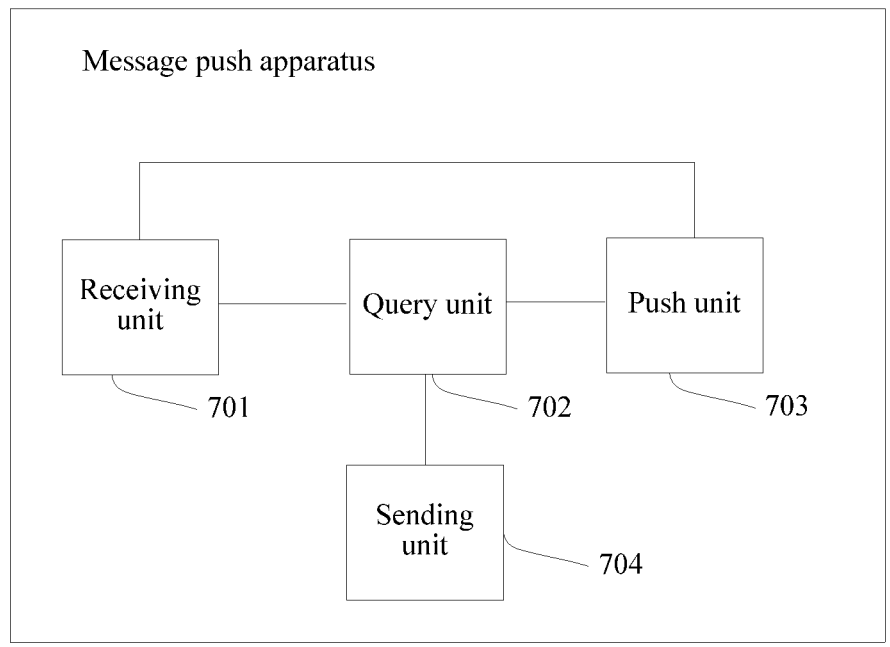

In a second implementation manner, the apparatus further includes a sending unit 704. As shown in FIG. 7B, the sending unit 704 is configured to acquire status information indicating that a message push service is activated for a user account corresponding to the user identity; and send, according to the service provider server identifier recorded in the information triplet and to the service provider server corresponding to the service provider server identifier, the status information indicating that the message push service is activated for the user account.

Figure 7C:
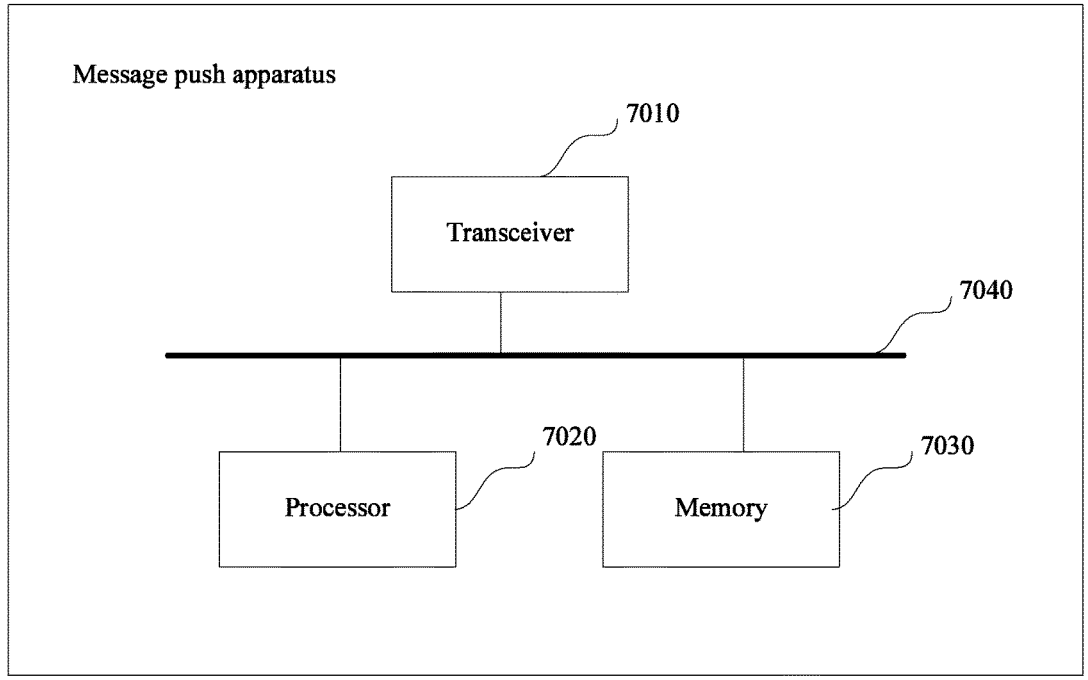

Based on the foregoing involved message push method and the message push apparatus, an embodiment of the present disclosure further provides a message push apparatus. As shown in FIG. 7C, the message push apparatus includes a transceiver 7010, a processor 7020, a memory 7030, and a bus 7040, where the transceiver 7010, the processor 7020, and the memory 7030 are all connected to the bus 7040.

The memory 7030 is connected to the processor 7020, and stores program code executed by the processor 7020.

The processor 7020 is connected to the memory 7030 and the bus 7040, and is configured to receive, by using the transceiver 7010 and according to a program stored by the memory 7030, a push request that is sent by a service provider server and that carries pushed message content, a service provider server identifier, and a user identity stored by the service provider server; query a preconfigured information triplet according to the service provider server identifier and the user identity; acquire a client identifier of a client that will receive the pushed message content; and push the pushed message content to the client according to the client identifier, where a correspondence among the service provider server identifier, the user identity, and the client identifier is recorded in the information triplet.

The foregoing process executed by the processor 7020 is usually controlled and completed by using one or more software programs. The foregoing one or more software programs are stored in the memory 7030. When the processor 7020 needs to execute the foregoing process, the foregoing one or more software programs are loaded to the processor 7020, and are controlled by the processor 7020 to complete the foregoing process. Certainly, the foregoing process executed by the processor 7020 may also be implemented by using hardware. This embodiment of the present disclosure sets no limitation thereto.

In a first implementation manner, the information triplet included in the processor 7020 includes the client identifier, the service provider server identifier, and the user identity; and the transceiver 7010 is configured to acquire the client identifier locally or acquire the client identifier from a push server side through network interaction; acquire the service provider server identifier from the service provider server side; and acquire the user identity from the service provider server side.

In a second implementation manner, the transceiver 7010 is further configured to acquire status information indicating that a message push service is activated for a user account corresponding to the user identity; and correspondingly, the processor 7020 is further configured to: send, according to the service provider server identifier recorded in the information triplet and to the service provider server corresponding to the service provider server identifier, the status information indicating that the message push service is activated for the user account.

The message push apparatus involved in the foregoing embodiment of the present disclosure may be configured to execute an implementation process of the message push methods in FIG. 1 to FIG. 3C. Therefore, for inexhaustively described parts of the message push apparatuses involved in FIG. 7A to FIG. 7C, reference may be further made to related description in FIG. 1 to FIG. 3C, and details are not described herein again.

According to the message push apparatus provided in this embodiment of the present disclosure, a PUSH request sent by an SP server carries an spID and a userID, and does not carry a deviceID of a client. After receiving the spID and the userID that are carried in the PUSH request, a PUSH server queries a preconfigured information triplet, determines a deviceID of a client that will receive pushed message content, and pushes the pushed message content to the client according to the determined deviceID. Therefore, in the present disclosure, a message can be pushed in a case in which an SP server does not need to acquire a deviceID of a target terminal, thereby preventing private data from being exposed.

Figure 8A:
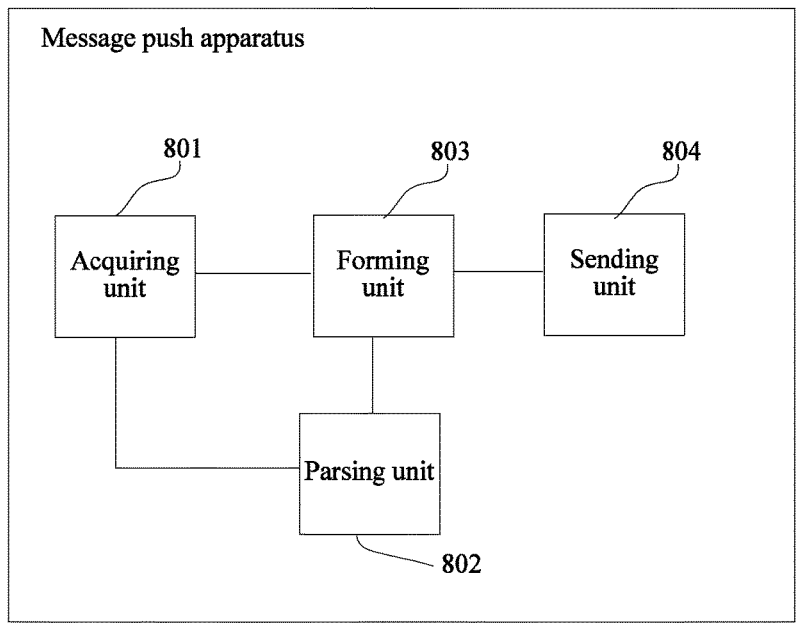
FIG. 8A and FIG. 8B are schematic structural diagrams of another message push apparatus according to an embodiment of the present disclosure.

Based on the message push method that is executed based on the client in the foregoing embodiment, an embodiment of the present disclosure further provides a message push apparatus. As shown in FIG. 8A, the message push apparatus includes an acquiring unit 801, a parsing unit 802, a forming unit 803, and a sending unit 804.

The acquiring unit 801 is configured to acquire interaction information that includes a service provider server identifier and a user identity that is stored by a service provider server, and send the interaction information to the parsing unit 802; and is further configured to acquire a client identifier and send the client identifier to the forming unit 803.

The parsing unit 802 is configured to parse the interaction information to obtain the service provider server identifier and the user identity, and send, to the forming unit 803, the service provider server identifier and the user identity that are obtained through parsing.

The forming unit 803 is configured to form an information triplet by using the service provider server identifier, the user identity, and the client identifier.

The sending unit 804 is configured to send the information triplet formed by the forming unit 803 to a push server, so that the push server pushes a message according to the information triplet.

In a first implementation manner, the acquiring unit 801 is specifically configured to acquire, by scanning a graphic code provided by the service provider server side, the interaction information that includes the service provider server identifier and the user identity; or acquire, by accessing a uniform resource locator link address provided by the service provider server, the interaction information that includes the service provider server identifier and the user identity; or acquire, by accessing, in a manner of NFC, an NFC tag provided by the service provider server, the interaction information that includes the service provider server identifier and the user identity.

In a second implementation manner, the acquiring unit 801 is specifically configured to: acquire the client identifier from a local client side; or acquire the client identifier from the push server side by performing network interaction with the push server.

Figure 8B:
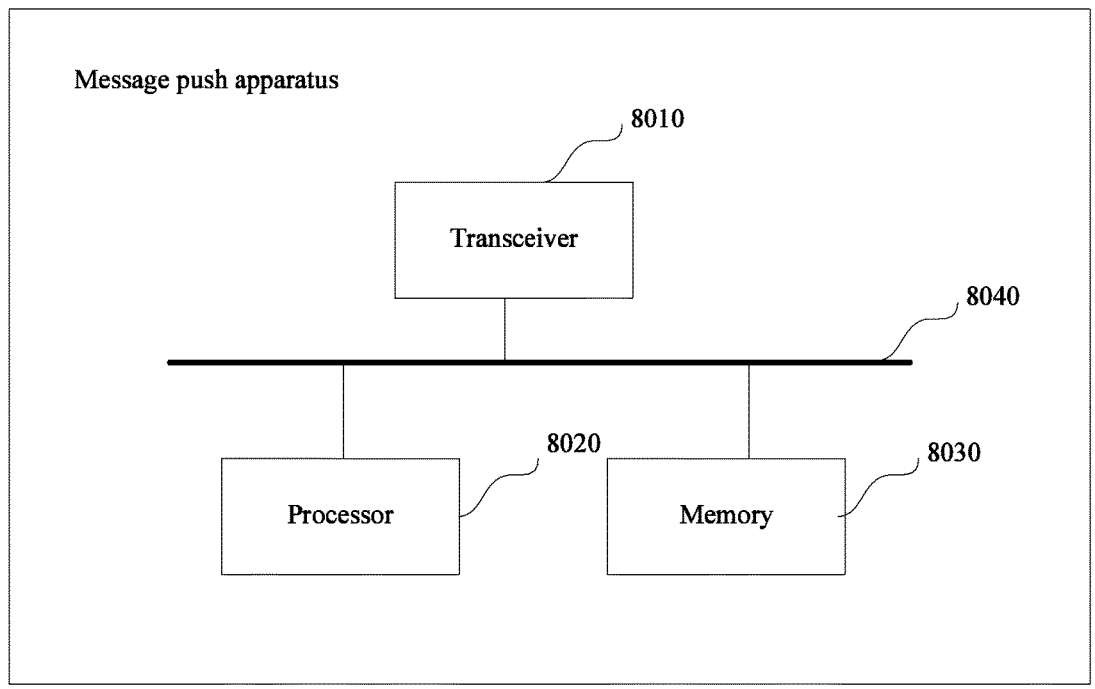

Based on the message push method and message push apparatus provided in the foregoing embodiments, an embodiment of the present disclosure further provides another message push apparatus. As shown in FIG. 8B, the message push apparatus includes a transceiver 8010, a processor 8020, a memory 8030, and a bus 8040, where the transceiver 8010, the processor 8020, and the memory 8030 are all connected to the bus 8040.

The memory 8030 is connected to the processor 8020, and stores program code executed by the processor 8020.

The processor 8020 is connected to the memory 8030 and the bus 8040, and is configured to acquire, by using the transceiver 8010 and according to a program stored by the memory 8030, a client identifier and interaction information that includes a service provider server identifier and a user identity that is stored by a service provider server; parse the interaction information to obtain the service provider server identifier and the user identity; form an information triplet by using the service provider server identifier, the user identity, and the client identifier; and send the information triplet to a push server, so that the push server pushes a message according to the information triplet.

The foregoing process executed by the processor 8020 is usually controlled and completed by using one or more software programs. The foregoing one or more software programs are stored in the memory 8030. When the processor 8020 needs to execute the foregoing process, the foregoing one or more software programs are loaded to the processor 8020, and are controlled by the processor 8020 to complete the foregoing process. Certainly, the foregoing process executed by the processor 8020 may also be implemented by using hardware. This embodiment of the present disclosure sets no limitation thereto.

In a first implementation manner, the transceiver 8010 is configured to acquire, by scanning a graphic code provided by the service provider server side, the interaction information that includes the service provider server identifier and the user identity; or acquire, by accessing a uniform resource locator link address provided by the service provider server, the interaction information that includes the service provider server identifier and the user identity; or acquire, by accessing, in a manner of NFC, an NFC tag provided by the service provider server, the interaction information that includes the service provider server identifier and the user identity.

In a second implementation manner, the transceiver 8010 is configured to acquire the client identifier from a local client side; or acquire the client identifier from the push server side by performing network interaction with the push server.

The message push apparatus involved in the foregoing embodiment of the present disclosure may be configured to execute an implementation process of the message push method in FIG. 4. Therefore, for inexhaustively described parts of the message push apparatuses involved in FIG. 8A and FIG. 8B, reference may be further made to related description in FIG. 4, and details are not described herein again.

According to the message push apparatus provided in this embodiment of the present disclosure, an information triplet is formed on a client, so that a PUSH server queries information about a preconfigured information triplet according to an spID and a userID that are carried in a PUSH request, acquires a deviceID of a client that will receive pushed message content, and pushes the pushed message content to the client according to the acquired deviceID. Therefore, according to the present disclosure, a message can be pushed in a case in which an SP server does not need to acquire a deviceID of a client, thereby preventing private data from being exposed.

Figure 9:
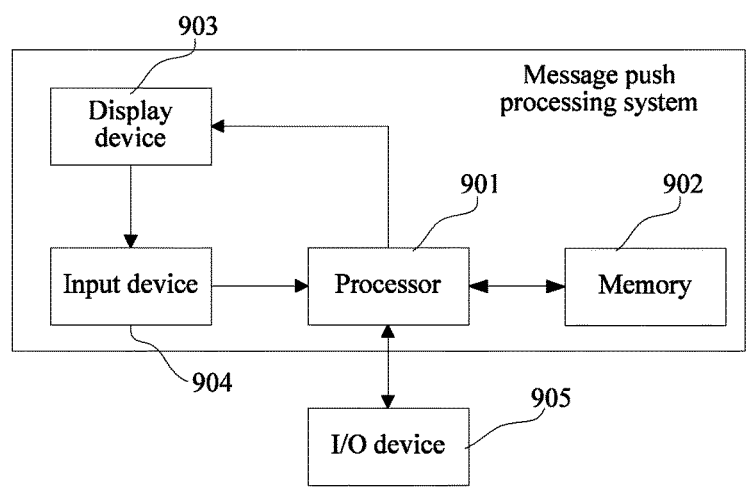
FIG. 9 is a schematic structural diagram of a message push processing system according to an embodiment of the present disclosure.

Based on the message push method and apparatus provided above, an embodiment of the present disclosure provides a message push processing system. As shown in FIG. 9, the message push processing system includes a processor 901, a memory 902, a display device 903, an input device 904, and an input/output (I/O) device 905.

The processor 901 is configured to execute the following process according to a related program stored in the memory 902: receiving a PUSH request that is sent by an SP server and that carries pushed message content, an SP server identifier spID, and a user identity userID stored by the SP server, querying a preconfigured information triplet according to the spID and the userID, and acquiring a client identifier deviceID of a client that will receive the pushed message content, where a correspondence among the spID, the userID, and the deviceID is recorded in the information triplet; and pushing the pushed message content to the client according to the deviceID.

The processor 901 is further configured to parse interaction information acquired by the I/O device 905, to obtain the spID and the userID; acquire the client identifier deviceID; form the information triplet by using the spID, the userID, and the deviceID; and send the information triplet to a PUSH server, so that the PUSH server pushes a message according to the information triplet.

The processor 901 in this embodiment of the present disclosure may be implemented on a single chip, multiple chips or multiple electronic components, and multiple architectures, including a dedicated or embedded processor, a dedicated processor, a controller, and an ASIC, may be used.

The memory 902 is operatively connected to the processor 901, and is configured to store various program code required by the processor 901 to execute the foregoing process. The memory 902 includes a read-only memory (ROM), a random-access memory (RAM), a hard disk drive, or the like. Information may also reside on a removable storage medium, and is loaded to or installed on the message push processing system when needed, where the removable storage medium includes, for example, a compact disc ROM (CD-ROM), a personal computer (PC) Card, a storage card, a floppy disk, a magnetic tape, and a network assembly.

The display device 903 is operatively connected to the processor 901, and is configured to receive a graphic display of the interaction information captured by the processor 901 and displays of various intermediate results and a final result of the foregoing process that is completed by the processor 901. A graphical user interface (GUI) is usually configured on the display device 903, where the GUI provides an easy-to-use user interface between a user of the message push processing system and an operating system or application that runs on the message push processing system. The GUI represents a program, a file, and an operation option by using a graph or an image, and the user can select and activate various graphs and images by operating the display device, so as to enable functions or tasks related to the graphs and images.

The input device 904 is operatively connected to the processor 901, and may be used to input information that needs to be manually input.

The I/O device 905 is configured to receive, from the client, various presentation information, including but is not limited to NFC, a graphic code, a sound code, send the input information to the processor 901, and interact with the PUSH server. There may be one or more I/O devices 905, and the I/O device 905 may be integrated with the message push processing system, or may be an independent peripheral (such as a keyboard, a printer, a scanner, a camera or a loudspeaker). If the I/O device 905 is a peripheral, the I/O device 905 may be connected to the message push processing system by using a wired connection (for example, a cable or a port) or a wireless connection (for example, Bluetooth).

According to the message push processing system provided in this embodiment of the present disclosure, a PUSH request sent by an SP server carries an spID and a userID, and does not carry a device identifier deviceID of a target terminal. After receiving the spID and the userID that are carried in the PUSH request, a PUSH server queries a preconfigured information triplet, determines a deviceID of a client that will receive pushed message content, and pushes the pushed message content to the client according to the determined deviceID. Therefore, according to this embodiment of the present disclosure, a message can be pushed in a case in which an SP server does not need to acquire a deviceID of a target terminal, thereby preventing private data from being exposed.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A message push method comprising:
receiving, by a push server, a push request from a service provider server, wherein the push request comprises pushed message content, a service provider server identifier, and a user identifier;
querying a memory of the push server for an information triplet comprising at least one of the service provider server identifier and the user identity;
acquiring, by the push server, a client identifier comprising an address for transmitting to a client that will receive the pushed message content, wherein the information triplet further comprises the client identifier; and
pushing the pushed message content to the client identifier.

2. The method of claim 1, wherein the information triplet comprises the service provider server identifier, the user identity, and the client identifier, and wherein the information triplet is received from the client.

3. The method of claim 2, wherein prior to receiving the push request, the method further comprises: transmitting status information to the service provider server in response to receiving the information triplet, the status information indicating the client has subscribed to message content of the service provider server.

4. The method of claim 3, wherein the status information does not comprise the client identifier.

5. The method of claim 1 further comprising shielding, by the push server, the client identifier from the service provider server.

6. A message push method comprising:
receiving, by a client from a service provider server, interaction information comprising a service provider server identifier and a user identity, the user identity associated with a client account of the client with a service provider;
forming, by the client, an information triplet comprising the service provider server identifier, the user identity, and a client identifier, wherein the client identifier comprises an address for transmitting to the client; and
sending the information triplet to a push server.

7. The method of claim 6, wherein receiving the interaction information comprises scanning a graphic code provided by the service provider server.

8. The method of claim 6, wherein receiving the interaction information comprises accessing a uniform resource locator (URL) provided by the service provider server.

9. The method of claim 6, wherein receiving the interaction information comprises accessing a near field communication tag provided by the service provider server.

10. The method of claim 6, wherein acquiring the client identifier comprises acquiring the client identifier from the client.

11. The method of claim 6, wherein acquiring the client identifier comprises acquiring the client identifier from the push server.

12. The method of claim 6, wherein the service provider server comprises a gaming server.

13. The method of claim 6 further comprising receiving, by the client, pushed message content of the service provider server from the push server.

14. A push server comprising:
a transceiver configured to receive, from a service provider, a push request comprising pushed message content, a service provider server identifier, and a user identifier;
a memory; and
a processor coupled to the transceiver and the memory, wherein the processor is configured to:
query the memory for an information triplet comprising at least one of the service provider server identifier and the user identity; and
acquire a client identifier comprising an address for transmitting to a client that will receive the pushed message content, wherein the information triplet further comprises the client identifier, and
wherein the transceiver is further configured to push the pushed message content to the client identifier.

15. The push server of claim 14, wherein the information triplet comprises the service provider server identifier, the user identity, and the client identifier, and wherein the transceiver is configured to receive the information triplet from the client.

16. The push server of claim 15, wherein the transceiver is further configured to send status information to the service provider server in response to receiving the information triplet, the status information indicating the client has subscribed to message content of the service provider server.

17. The push server of claim 16, wherein the status information does not comprise the client identifier.

18. The push server of claim 14, wherein the processor is further configured to shield the client identifier from the service provider server.

* * * * *

UNITED STATES PATENT AND TRADEMARK OFFICE
CERTIFICATE OF CORRECTION

PATENT NO.        : 10,009,303 B2
APPLICATION NO.   : 15/110483
DATED             : June 26, 2018
INVENTOR(S)       : Ping Li, Jianhua Guo and Jingyu Lai It is certified that error appears in the above-identified patent and that said Letters Patent is hereby corrected as shown below:

On the Title Page

Item (*), Notice, Line 3: "0 days. days." should be "0 days."

Signed and Sealed this
Twenty-first Day of August, 2018

Andrei Iancu
*Director of the United States Patent and Trademark Office*